United States Patent
Lin

(10) Patent No.: US 8,531,859 B2
(45) Date of Patent: Sep. 10, 2013

(54) REVERSIBLE ALTERNATING-CURRENT AND DIRECT-CURRENT CONVERSION APPARATUS WITH HIGH FREQUENCY

(75) Inventor: Yu-Tse Lin, Douliou (TW)

(73) Assignee: Soltec Technology Co., Ltd., Douliou (TW)

( * ) Notice: Subject to any disclaimer, the term of this patent is extended or adjusted under 35 U.S.C. 154(b) by 352 days.

(21) Appl. No.: 12/980,416

(22) Filed: Dec. 29, 2010

(65) Prior Publication Data

US 2012/0169128 A1 Jul. 5, 2012

(51) Int. Cl.
*H02M 11/00* (2006.01)

(52) U.S. Cl.
USPC ............................ 363/142; 307/72; 307/82

(58) Field of Classification Search
USPC ............... 307/64, 70, 80–82, 85–87, 22, 26, 307/29, 72; 363/142–143
See application file for complete search history.

(56) References Cited

U.S. PATENT DOCUMENTS

| | | | | |
|---|---|---|---|---|
| 6,201,319 B1 * | 3/2001 | Simonelli et al. | ............... | 307/26 |
| 6,654,261 B2 * | 11/2003 | Welches et al. | .................. | 363/41 |
| 7,612,469 B2 * | 11/2009 | Kuo | ................................ | 307/80 |

* cited by examiner

*Primary Examiner* — Harry Behm
(74) *Attorney, Agent, or Firm* — Alan Kamrath; Kamrath IP Lawfirm, P.A.

(57) ABSTRACT

An alternating-current and direct-current conversion apparatus includes a first converter unit, a switching unit electrically connected with the first converter unit, and a second converter unit electrically connected with the switching unit. The switching unit is connected between the first converter unit and the second converter unit and is operated to convert a direct-current power into an alternating-current power or to convert an alternating-current power into a direct-current power so that the direct-current power of the direct-current source is converted into an alternating-current power which can be used by the alternating-current source, and the alternating-current power of the mains power supply is converted into a direct-current power which can be used by the direct-current source.

1 Claim, 6 Drawing Sheets

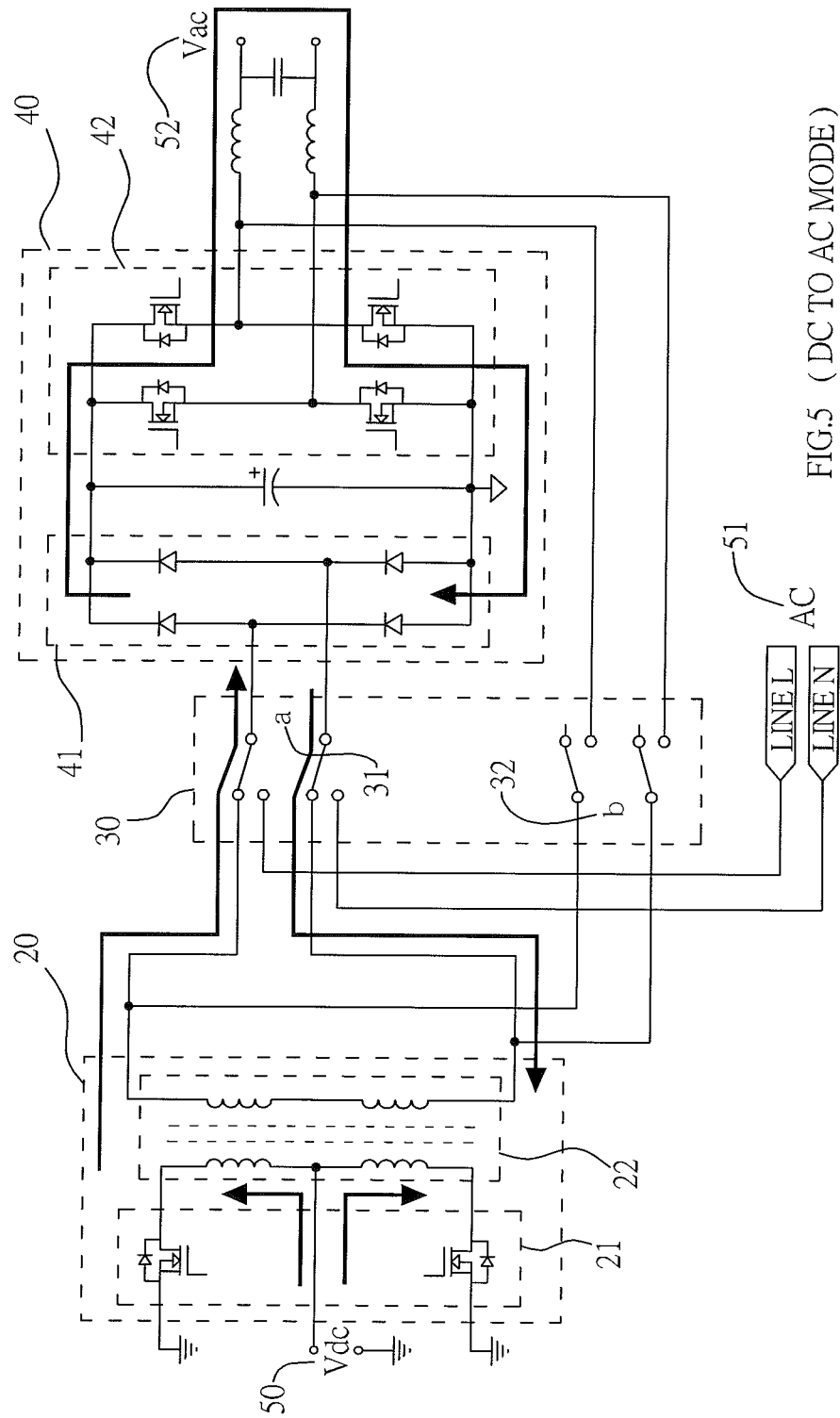
FIG.5 (DC TO AC MODE)

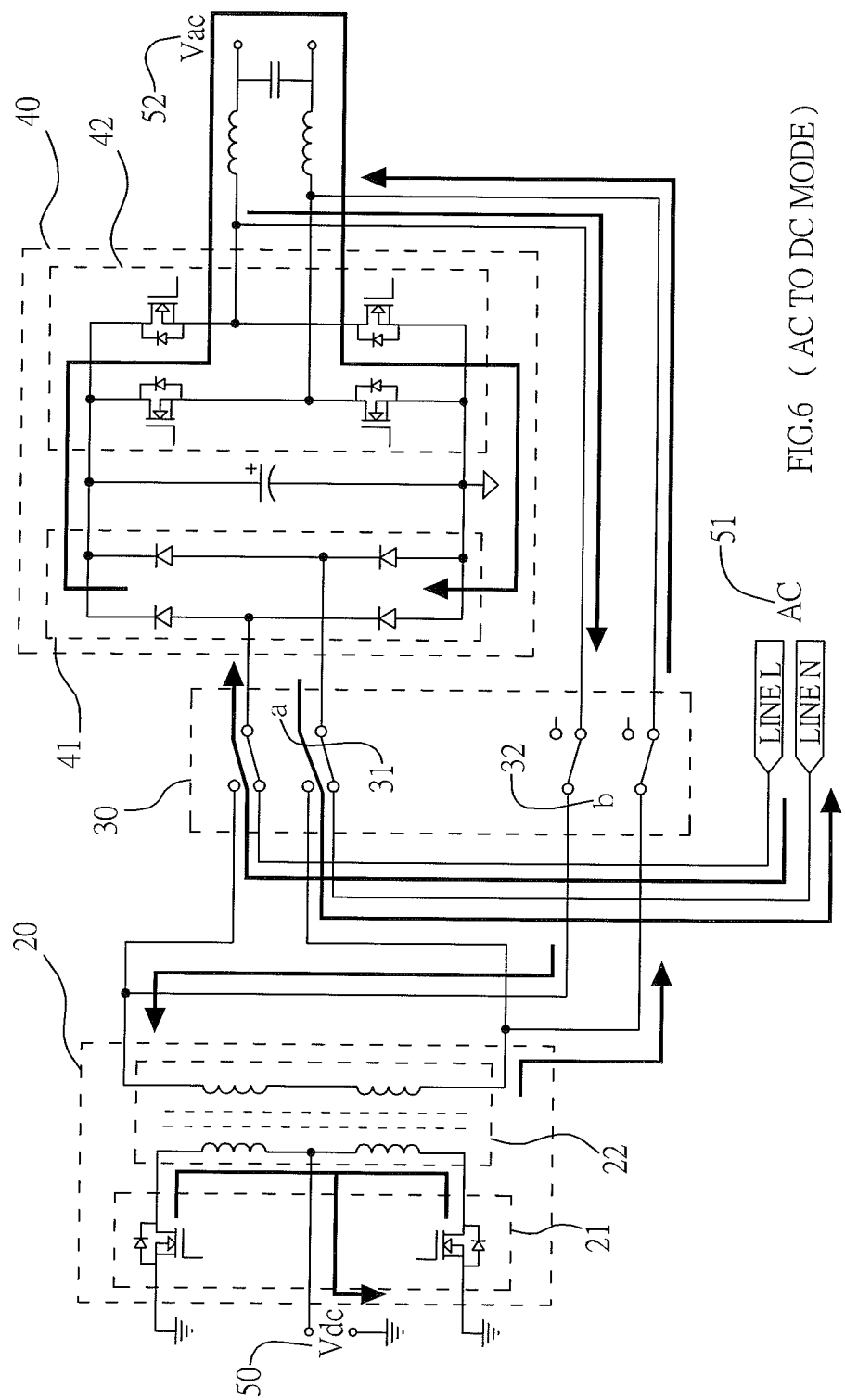
FIG.6 (AC TO DC MODE)

REVERSIBLE ALTERNATING-CURRENT AND DIRECT-CURRENT CONVERSION APPARATUS WITH HIGH FREQUENCY

BACKGROUND OF THE INVENTION

1. Field of the Invention

The present invention relates to a conversion apparatus and, more particularly, to an alternating-current and direct-current conversion apparatus that is operated in a two-way manner.

2. Description of the Related Art

A conventional DC (direct-current) to AC (alternating-current) conversion apparatus in accordance with the prior art shown in FIG. 1 comprises a first converter 11, a high frequency transformer 12, a rectifier 13 and a second converter 14. The first converter 11 is electrically connected between a direct-current source 1 and the high frequency transformer 12. The high frequency transformer 12 is electrically connected between the first converter 11 and the rectifier 13. The rectifier 13 is electrically connected between the high frequency transformer 12 and the second converter 14. The second converter 14 is electrically connected between the rectifier 13 and an alternating-current source 2. In operation, the first converter 11 and the high frequency transformer 12 convert and transform the direct-current power of the direct-current source 1 into a high voltage direct-current power. Then, the rectifier 13 and the second converter 14 transform the high voltage direct-current power into a high voltage alternating-current power which is outputted from the alternating-current source 2. Thus, the direct-current power of the direct-current source 1 is directly converted into an alternating-current power which is used by the alternating-current source 2. However, the alternating-current power of the alternating-current source 2 cannot be directly converted into the direct-current power of the direct-current source 1 so that it is necessary to additionally provide an AC (alternating-current) to DC (direct-current) conversion apparatus.

A conventional AC (alternating-current) to DC (direct-current) conversion apparatus in accordance with the prior art shown in FIG. 2 comprises a first rectifier 15, a converter 16, a high frequency transformer 17, and a second rectifier 18. The first rectifier 15 is electrically connected between a mains power supply 3 and the converter 16. The converter 16 is electrically connected between the first rectifier 15 and the high frequency transformer 17. The high frequency transformer 17 is electrically connected between the converter 16 and the second rectifier 18. The second rectifier 18 is electrically connected between the high frequency transformer 17 and the direct-current source 1. In operation, the first rectifier 15 rectifies the alternating-current power of the mains power supply 3 into a direct-current power. Then, the converter 16 converts the direct-current power into a high frequency direct-current power. Then, the high frequency transformer 17 drops the voltage of and rectifies the high frequency direct-current power into a low voltage direct-current power which is outputted from the direct-current source 1. Thus, the alternating-current power of the mains power supply 3 is directly converted into a direct-current power which is used by the direct-current source 1. However, the direct-current power of the direct-current source 1 cannot be directly converted into the alternating-current power of the mains power supply 3 so that it is necessary to additionally provide a DC (direct-current) to AC (alternating-current) conversion apparatus.

BRIEF SUMMARY OF THE INVENTION

In accordance with the present invention, there is provided an alternating-current and direct-current conversion apparatus, comprising a first converter unit, a switching unit electrically connected with the first converter unit, and a second converter unit electrically connected with the switching unit. The switching unit is electrically connected between the first converter unit and the second converter unit to convert an alternating-current power into a direct-current power or to convert a direct-current power into an alternating-current power by a switching operation of the switching unit.

The first converter unit includes a first converter and a high frequency transformer. The first converter of the first converter unit is electrically connected between a direct-current source and the high frequency transformer. The high frequency transformer of the first converter unit is electrically connected between the first converter and the switching unit. The second converter unit includes a rectifier and a second converter. The rectifier of the second converter unit is electrically connected between the switching unit and the second converter. The second converter of the second converter unit is electrically connected between the rectifier and an alternating-current source.

The switching unit is electrically connected to an external mains power supply. The switching unit includes a first switch and a second switch. The first switch of the switching unit is electrically connected between the first converter unit and the second converter unit to connect the first converter unit with the second converter unit or electrically connected between the mains power supply and the second converter unit to connect the mains power supply with the second converter unit. The second switch of the switching unit is electrically connected between the first converter unit and the second converter unit.

The switching unit is operable between a first switching mode in which the first switch of the switching unit is switched to connect the first converter unit with the second converter unit, and the second switch of the switching unit is switched to interrupt the connection between the first converter unit and the second converter unit, and a second switching mode in which the first switch of the switching unit is switched to connect the mains power supply with the second converter unit, and the second switch of the switching unit is switched to connect the first converter unit with the second converter unit.

The primary objective of the present invention is to provide a reversible alternating-current and direct-current conversion apparatus with a high frequency.

According to the primary advantage of the present invention, the switching unit is connected between the first converter unit and the second converter unit and is operated to convert a direct-current power into an alternating-current power or to convert an alternating-current power into a direct-current power so that the direct-current power of the direct-current source is converted into an alternating-current power which can be used by the alternating-current source, and the alternating-current power of the mains power supply is converted into a direct-current power which can be used by the direct-current source.

According to another advantage of the present invention, the alternating-current and direct-current conversion apparatus is a reversible circuit which has a two-way converting function to convert a direct-current power into an alternating-current power and to convert an alternating-current power into a direct-current power so as to simplify the structure, to reduce the volume and to decrease the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 5 is a schematic operational view of the alternating-current and direct-current conversion apparatus as shown in FIG. 4.

FIG. 6 is a schematic operational view of the alternating-current and direct-current conversion apparatus as shown in FIG. 4.

DETAILED DESCRIPTION OF THE INVENTION

Figure 1:
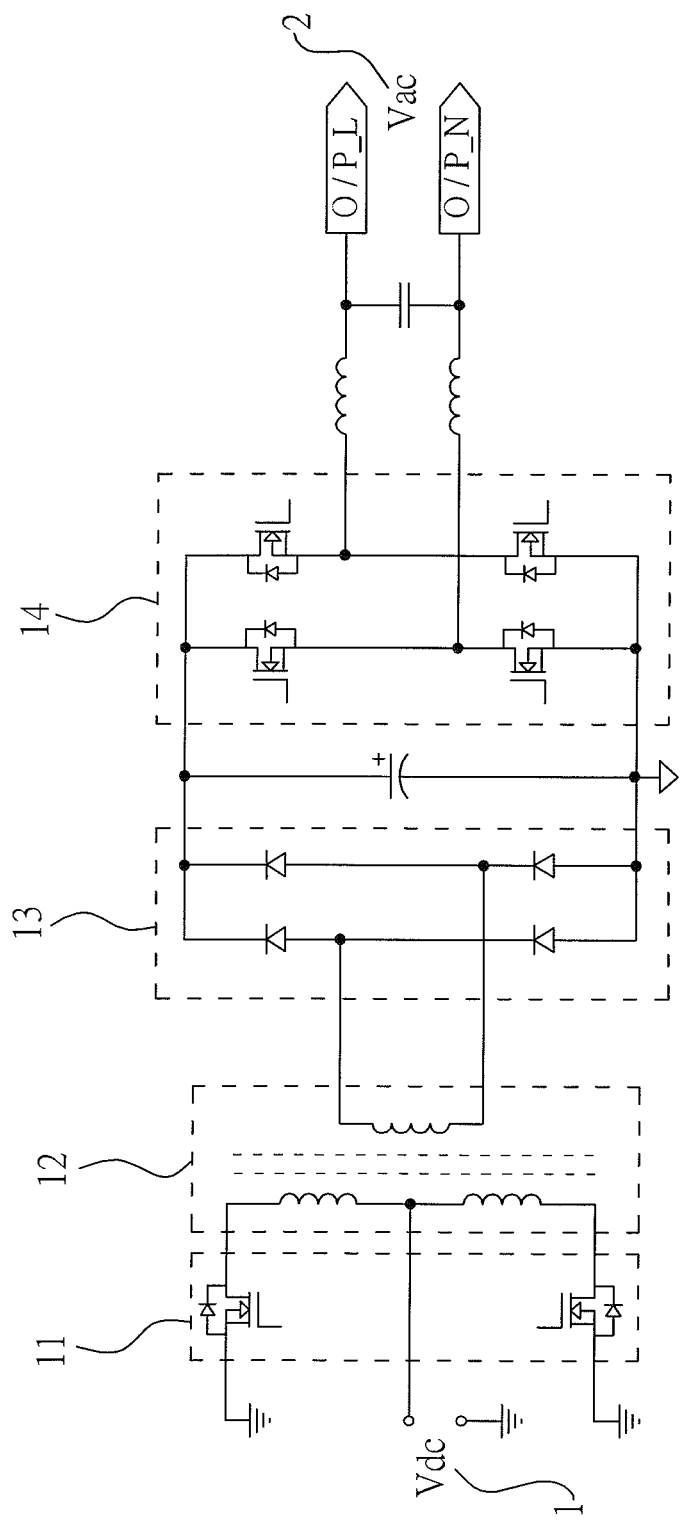
FIG. 1 is a circuit diagram view of a conventional direct-current to alternating-current conversion apparatus in accordance with the prior art.
Figure 2:
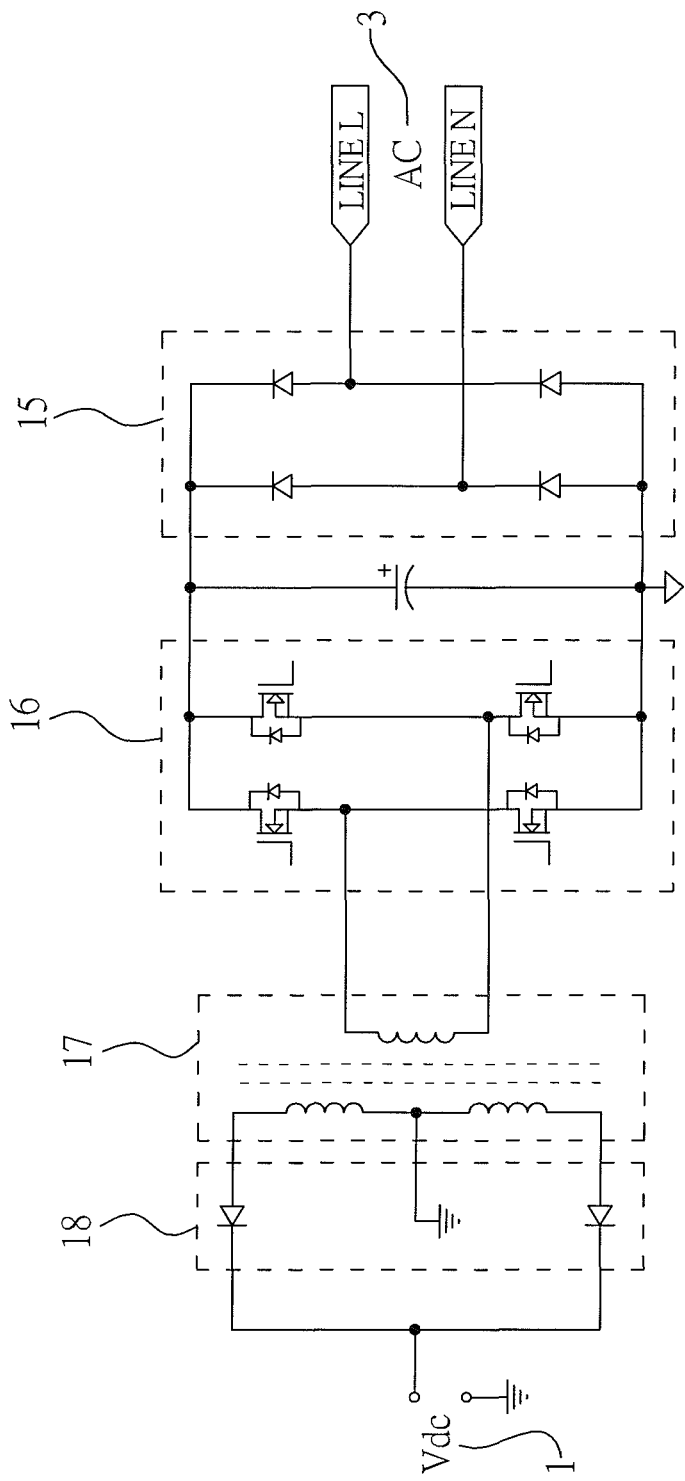
FIG. 2 is a circuit diagram view of a conventional alternating-current to direct-current conversion apparatus in accordance with the prior art.
Figure 3:
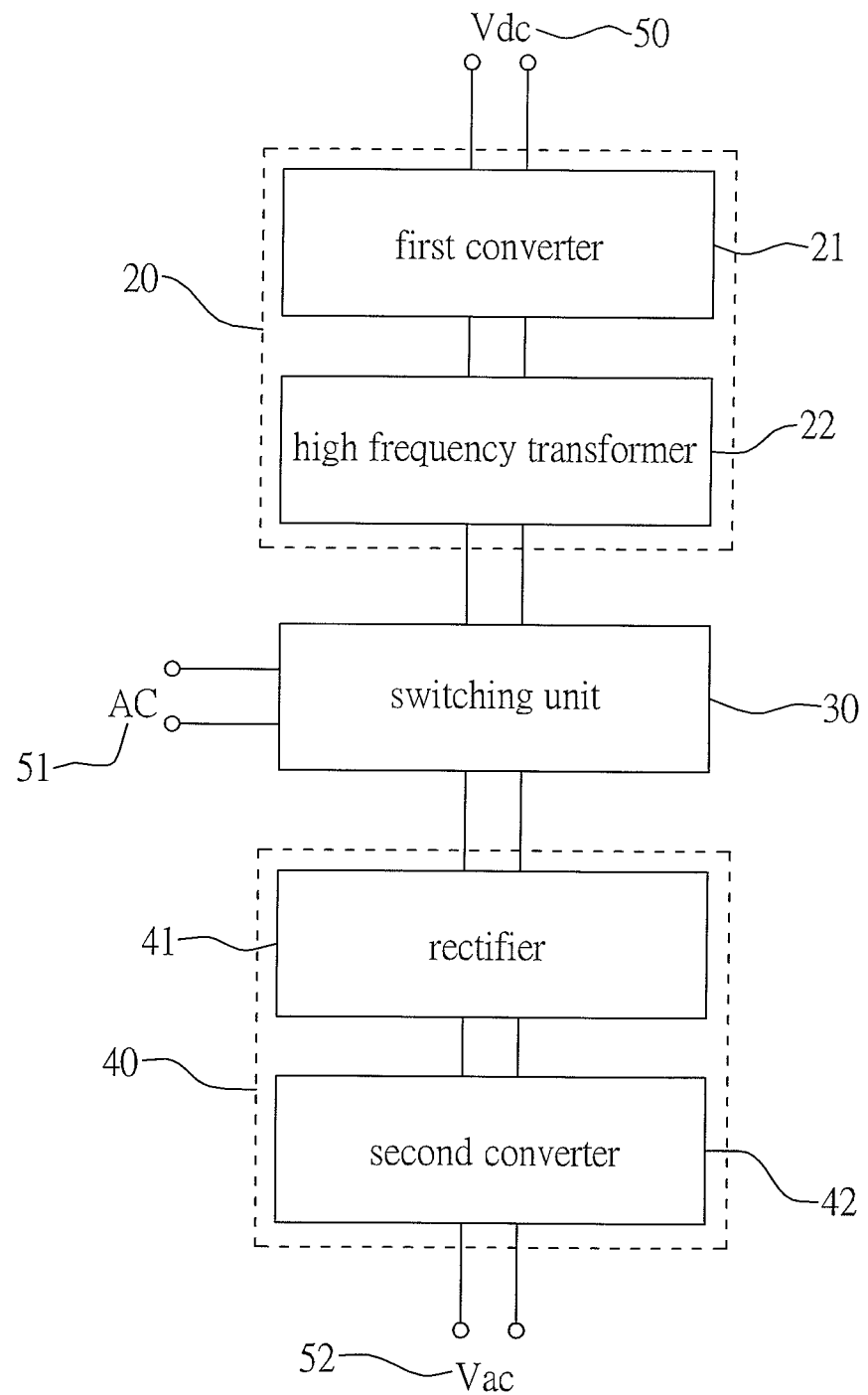
FIG. 3 is a block diagram of an alternating-current and direct-current conversion apparatus in accordance with the preferred embodiment of the present invention.
Figure 4:
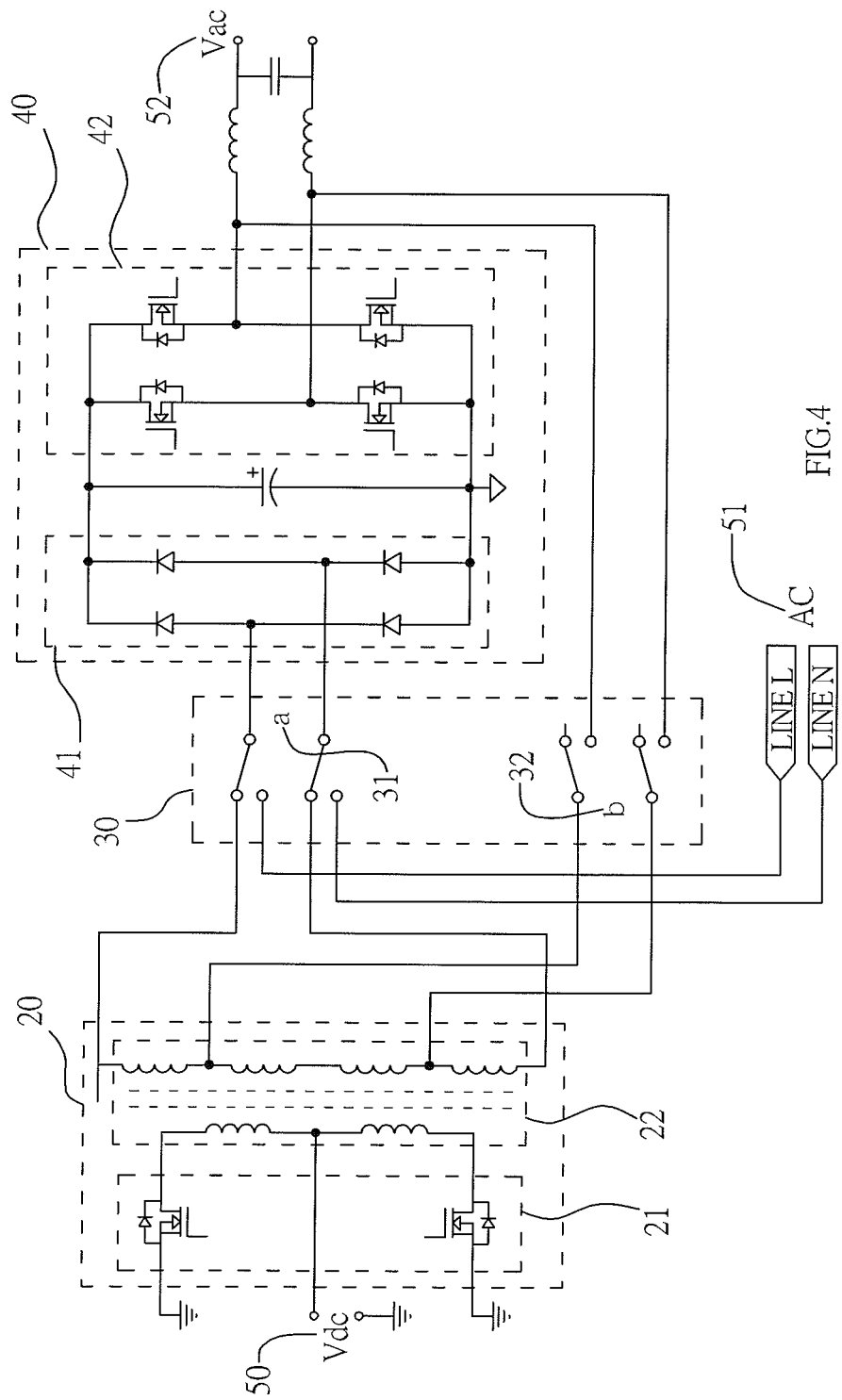
FIG. 4 is a circuit diagram view of the alternating-current and direct-current conversion apparatus as shown in FIG. 3.

Referring to the drawings and initially to FIGS. 3 and 4, an alternating-current and direct-current conversion apparatus in accordance with the preferred embodiment of the present invention comprises a first converter unit 20, a switching unit 30 electrically connected with the first converter unit 20, and a second converter unit 40 electrically connected with the switching unit 30. The switching unit 30 is electrically connected between the first converter unit 20 and the second converter unit 40 to convert an alternating-current power into a direct-current power or to convert a direct-current power into an alternating-current power by a switching operation of the switching unit 30.

The first converter unit 20 includes a first converter 21 and a high frequency transformer 22. The first converter 21 of the first converter unit 20 is electrically connected between a direct-current source 50 and the high frequency transformer 22. The high frequency transformer 22 of the first converter unit 20 is electrically connected between the first converter 21 and the switching unit 30.

The second converter unit 40 includes a rectifier 41 and a second converter 42. The rectifier 41 of the second converter unit 40 is electrically connected between the switching unit 30 and the second converter 42. The second converter 42 of the second converter unit 40 is electrically connected between the rectifier 41 and an alternating-current source 52.

The switching unit 30 is electrically connected to an external mains power supply 51. The switching unit 30 includes a first switch 31 and a second switch 32. The first switch 31 of the switching unit 30 is electrically connected between the first converter unit 20 and the second converter unit 40 to connect the first converter unit 20 with the second converter unit 40 or electrically connected between the mains power supply 51 and the second converter unit 40 to connect the mains power supply 51 with the second converter unit 40. The second switch 32 of the switching unit 30 is electrically connected between the first converter unit 20 and the second converter unit 40.

In practice, the switching unit 30 is operable between a first switching mode in which the first switch 31 of the switching unit 30 is switched to connect the first converter unit 20 with the second converter unit 40, and the second switch 32 of the switching unit 30 is switched to interrupt the connection between the first converter unit 20 and the second converter unit 40, and a second switching mode in which the first switch 31 of the switching unit 30 is switched to connect the mains power supply 51 with the second converter unit 40, and the second switch 32 of the switching unit 30 is switched to connect the first converter unit 20 with the second converter unit 40.

In the first switching mode of the switching unit 30, referring to FIG. 5 with reference to FIGS. 3 and 4, the switching unit 30 is switched to a DC (direct-current) to AC (alternating-current) mode. At this time, the first switch 31 of the switching unit 30 is switched to connect the first converter unit 20 with the second converter unit 40, and the second switch 32 of the switching unit 30 is switched to interrupt the connection between the first converter unit 20 with the second converter unit 40 so that the direct-current source 50 supplies the electric power. In such a manner, the first converter 21 and the high frequency transformer 22 of the first converter unit 20 convert and transform the direct-current power of the direct-current source 50 into a high voltage direct-current power. Then, the high voltage direct-current power of the first converter unit 20 is transmitted through the first switch 31 of the switching unit 30 into the second converter unit 40. Then, the rectifier 41 and the second converter 42 of the second converter unit 40 rectify and transform the high voltage direct-current power into a high voltage alternating-current power which is outputted from the alternating-current source 52. Thus, the direct-current power of the direct-current source 50 is converted into an alternating-current power which is used by the alternating-current source 52.

In the second switching mode of the switching unit 30, referring to FIG. 6 with reference to FIGS. 3 and 4, the switching unit 30 is switched to an AC (alternating-current) to DC (direct-current) mode. At this time, the first switch 31 of the switching unit 30 is switched to connect the mains power supply 51 with the second converter unit 40, and the second switch 32 of the switching unit 30 is switched to connect the first converter unit 20 with the second converter unit 40 so that the mains power supply 51 supplies the electric power. In such a manner, the rectifier 41 of the second converter unit 40 rectifies the alternating-current power of the mains power supply 51 into a direct-current power. Then, the second converter 42 of the second converter unit 40 converts the direct-current power into a high frequency direct-current power. Then, the high frequency direct-current power of the second converter unit 40 is transmitted through the second switch 32 of the switching unit 30 into the first converter unit 20. Then, the high frequency transformer 22 and the first converter 21 of the first converter unit 20 drop the voltage of and convert the high frequency direct-current power into a low voltage direct-current power which is outputted from the direct-current source 50. Thus, the alternating-current power of the mains power supply 51 is converted into a direct-current power which is used by the direct-current source 50.

Accordingly, the switching unit 30 is connected between the first converter unit 20 and the second converter unit 40 and is operated to convert a direct-current power into an alternating-current power or to convert an alternating-current power into a direct-current power so that the direct-current power of the direct-current source 50 is converted into an alternating-current power which can be used by the alternating-current source 52, and the alternating-current power of the mains power supply 51 is converted into a direct-current power which can be used by the direct-current source 50. In addition, the alternating-current and direct-current conversion apparatus is a reversible circuit which has a two-way converting function to convert a direct-current power into an alternating-current power and to convert an alternating-current power into a direct-current power so as to simplify the structure, to reduce the volume and to decrease the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An alternating-current and direct-current conversion apparatus comprising:
    a first converter unit including a first converter and a high frequency transformer, wherein the first converter of the first converter unit is electrically connected between a direct-current source and the high frequency transformer;
    a switching unit electrically connected to the first converter unit, wherein the high frequency transformer of the first converter unit is electrically connected between the first converter and the switching unit; and
    a second converter unit electrically connected with the switching unit, wherein the second converter unit includes a rectifier and a second converter, wherein the rectifier of the second converter unit is electrically connected between the switching unit and the second converter, wherein the second converter of the second converter unit is electrically connected between the rectifier and an alternating-current source, wherein:
    the switching unit is electrically connected between the first converter unit and the second converter unit to convert an alternating-current power into a direct-current power or to convert a direct-current power into an alternating-current power by a switching operation of the switching unit;
    the switching unit is electrically connected to an external mains power supply;
    the switching unit includes a first switch and a second switch;
    the first switch of the switching unit is electrically connected between the first converter unit and the second converter unit to connect the first converter unit with the second converter unit or electrically connected between the external mains power supply and the second converter unit to connect the external mains power supply with the second converter unit;
    the second switch of the switching unit is electrically connected between the first converter unit and the second converter unit; and
    the switching unit is operable between:
        a first switching mode in which the first switch of the switching unit is switched to connect the first converter unit with the second converter unit, and the second switch of the switching unit is switched to interrupt the connection between the first converter unit and the second converter unit; and
        a second switching mode in which the first switch of the switching unit is switched to connect the mains power supply with the second converter unit, and the second switch of the switching unit is switched to connect the first converter unit with the second converter unit.

* * * * *